United States Patent [19]
Chauvette

[11] 3,839,328

[45] Oct. 1, 1974

[54] USE OF MIXED ANHYDRIDE PROTECTING GROUP IN CLEAVING ACYL GROUPS FROM CEPHALOSPORINS AND PENICILLINS

[75] Inventor: Robert R. Chauvette, Indianapolis, Ind.

[73] Assignee: Eli Lilly and Company, Indianapolis, Ind.

[22] Filed: Feb. 19, 1971

[21] Appl. No.: 117,043

Related U.S. Application Data

[63] Continuation-in-part of Ser. No. 876,597, Nov. 13, 1969, abandoned.

[52] U.S. Cl.............. 260/243 C, 424/271, 424/246
[51] Int. Cl. ..................... C07d 99/16, C07d 99/24
[58] Field of Search ................................ 260/243 C

[56] References Cited
UNITED STATES PATENTS
3,499,909   3/1970   Weissenburger et al........ 260/243 C Primary Examiner—Nicholas S. Rizzo
Attorney, Agent, or Firm—William C. Martens, Jr.; Everet F. Smith

[57] ABSTRACT

In the process of cleaving the carboxamido group in the 6-position of a penicillin or the 7-position of a cephalosporin by the formation of an imino halide, conversion of the imino halide to an imino ether, and hydrolysis of the imino ether to a free amino group, the free carboxyl groups in the penicillin or cephalosporin molecules are protected by the formation of mixed anhydrides.

23 Claims, No Drawings

USE OF MIXED ANHYDRIDE PROTECTING GROUP IN CLEAVING ACYL GROUPS FROM CEPHALOSPORINS AND PENICILLINS

CROSS REFERENCE

This application is a continuation-in-part of my pending application Ser. No. 876,597, filed Nov. 13, 1969, now abandoned.

INTRODUCTION

This invention relates to processes for cleaving penicillin and cephalosporin compounds to obtain the respective nuclei which are intermediates in making more potent or new and different penicillin and cephalosporin antibiotic substances.

BACKGROUND OF THE INVENTION

The penicillins and cephalosporins are well-known families of antibiotics widely used in the treatment of disease. In the chemical modification of members of these families it is desirable to cleave the carboxamido group to obtain a free amino group in the 6-position of the penicillin or the 7-position of the cephalosporin. The reaction is of particular importance in the removal of the phenyacetyl side chain from benzyl penicillin, the phenoxyacetyl side chain from phenoxymethyl penicillin to yield 6-aminopenicillanic acid (6-APA) and the aminoadipoyl side chain of cephalosporin C to yield 7-aminocephalosporanic acid (7-ACA) and of desacetoxycephalosporin C to yield 7-aminodesacetoxycephalosporanic acid (7-ADCA).

One method of cleaving an amido group to obtain the free amine is that described by Lander, J. Chem. Soc. 83, 320 (1903). In accordance with Lander's method the amide is treated with a halogenating agent to convert the amido group to an imino halide followed by treating the imino halide with an alcohol to obtain the imino ether which is then hydrolyzed to the free amine. The application of this method to the cleavage of cephalosporin C to 7-ACA is disclosed in Canadian Pat. No. 770,125 and British Pat. No. 1,041,985.

In order to successfully apply this sequence of reactions to penicillins or cephalosporins, it is necessary first to protect the carboxyl groups in the molecule. It is particularly important to protect the carboxyl group in the 3-position of the penicillin and in the 4-position of the cephalosporin. Heretofore, these carboxyl groups generally have been protected by converting them to esters. With the exception of silyl esters, these esters are generally stable to the reaction conditions and the ester product must be subjected to further treatment in order to obtain the free acid. Such treatment involves a more rigorous acid or base hydrolysis or, in some instances, hydrogenolysis. These added steps result in added processing costs, and in the case of a more rigorous acid hydrolysis there is some hydrolysis of the acetoxy group at the $C_3$ methylene of cephalosporin C-type compounds to desacetyl cephalosporins and β-lactam ring opening in penicillin-type compounds; in the case of base hydrolysis there is the danger of isomerization of the double bond in the dihydrothiazine ring of cephalosporin C-type compounds and decomposition of penicillins.

Further, numerous procedures for the preparation of carbon esters lead to isomerization of the double bond in the cephalosporins so that a $\Delta^2$ product (isocephalosporin) is obtained. Silyl esters are more sensitive to traces of moisture and therefore less stable than carbon esters during the reaction. In fact, in some instances they are too easily removed. Further, the reagents used in the preparation of silyl esters are expensive and not always readily available in commercial quantities.

SUMMARY

I have now discovered that the carboxyl groups of penicillins and cephalosporins may be protected during the cleavage reaction by the formation of mixed anhydrides. The anhydride in the 3-position of the penicillins and in the 4-position of the cephalosporins and desacetoxycephalosporins is stable during the early steps of the cleavage process, but is sufficiently labile to be removed during the alcoholysis or during the hydrolysis of the imino ether. Thus, the product following a mild hydrolysis step is the free acid and not an ester thereof.

My anhydride method of carboxyl protection during the cleavage reaction overcomes many of the disadvantages of methods of carboxyl protection in the prior art. My mixed anhydrides are inexpensively prepared from readily available acid chlorides or ketenes. They avoid an additional carboxyl deblocking step with accompanying double bond isomerization and deacetylation at the $C_3$ methylene of cephalosporins and β-lactam opening in penicillins as is the case when many carbon esters are removed.

My improvement in the cleavage reaction will find particular application in the cleavage of penicillin G or penicillin V to 6-APA and in the cleavage of cephalosporin C or its derivatives to 7-ACA, or its derivatives.

DESCRIPTION OF THE PREFERRED EMBODIMENT

My invention is an improvement in the prior art process for the cleavage of 6-carboxamido groups from penicillins and 7-carboxamido groups from cephalosporins. In a method for the cleavage of a 6-carboxamido group of penicillins or 7-carboxamido group of a cephalosporin by blocking the carboxyl and other sensitive groups, treating the blocked penicillin or cephalosporin with a halogenating agent to convert the amido group to an imino halide, treating the imino halide with an alcohol to obtain an imino ether, and hydrolyzing the imino ether to give a free 6-amino or 7-amino group, my invention is the improvement which comprises blocking the carboxyl groups by converting them to mixed anhydrides. Thus, in my improved process all the steps are the same as in the prior art except for the step of blocking the carboxyl groups.

The penicillins and cephalosporins that may be treated by my process are in a penicillin having the formula (I)

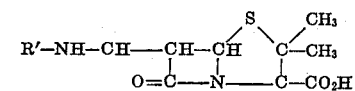

or a cephalosporin having the formula (II)

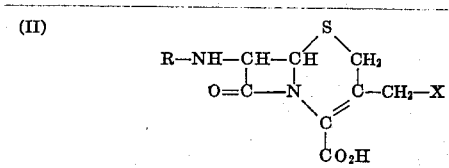

where R' in the penicillin (I) above is as defined by R hereinbelow or is the acyl residue of a penicillin obtained by fermentation procedures, exemplified by Behrens U.S. Pat. Nos. 2,479,295, 2,479,296, 2,479,297; 2,562,407, 2,562,408, 2,562,409, 2,562,410, 2,562,411, and 2,623,876, and R is aminoadipoyl [HOOC-CH(NH$_2$)-(CH$_2$)$_3$-C(O)-]

an N-protected aminoadipoyl,

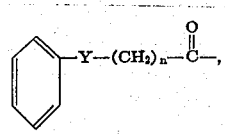

or

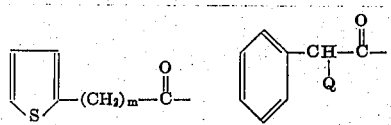

X is
C$_2$-C$_6$-alkanoyl,
C$_2$-C$_6$-alkanoylthio

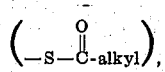

C$_6$-C$_{12}$-aroylthio

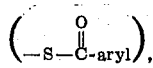

hydroxy,
mercapto,
hydrogen,
C$_1$-C$_6$-alkoxy, or
C$_1$-C$_6$-alkylthio;
Y is oxygen, sulfur, or a carbon to carbon bond;
n is an integer of 0 to 3 and is at least 1 when Y is oxygen or sulfur;
m is an integer of 1 to 3; and
Q is amino or hydroxy,
as well as the complexes of such cephalosporin compounds with zinc or related metallic ions.

In the case of penicillins, when R' is R and R is aminoadipoyl, the penicillin is penicillin N. Penicillins wherein R' is a C$_2$-C$_8$-alkanoyl are exemplified by those mentioned in the above cited Behrens patents. The fermentation derived penicillins, penicillin G and penicillin V, are probably the most commercially used examples of penicillins containing the acyl radical.

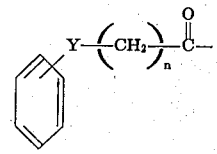

2-Thienyl-,3-thienyl, and the penicillins in U.S. Pat. No. 2,562,411 exemplify useful penicillins wherein the acyl group is one of the formula

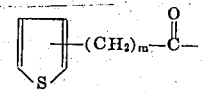

Penicillins containing the

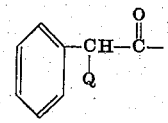

group are exemplified by ampicillin and α-hydroxy-α-phenylmethyl penicillin. Numerous other penicillins could be named for use in this process. Those penicillins derived by fermentation procedures are believed to be the most practical ones for use in this improved process.

Thus, my process can be used with virtually any penicillin or cephalosporin. When R in the above formula II is a 5-aminoadipoyl group and X is acetoxy the cephalosporin is cephalosporin C. R may be such other groups as acetyl butyryl, heptanoyl, phenylacetyl, phenoxyacetyl, phenylthioacetyl, 2-thienylacetyl, 3-thienylacetyl, phenylglycyl, mandelyl, or the like.

Instead of being acetoxy X in the above, formula II can by hydrogen, hydroxy, mercapto (-SH), propionoxy, butyroyloxy, hexanonoyloxy, acetylthio, propionylthio, ethylthionocarbonylthio, pentanoylthio, phenylthionocarbonylthio, tolylthionocarbonyloxy, naphthylthionocarbonylthio, methylthionocarbonylthio, ethylthionocarbonylthio, ethoxythionocarbonylthio, propoxythionocarbonylthio, methoxy, ethoxy, hexyloxy, methylthio, ethylthio, propylthio, thioacetyl, thiobutyryl, thiobenzoyl or p-nitrobenzoylthio.

It is to be understood that when the penicillin or cephalosporin contains an amino, hydroxy or mercapto group such group is blocked prior to the cleavage reaction. Amino, hydroxy, and mercapto blocking groups are well known to those skilled in the art. If the amino, hydroxy, or mercapto group is in the 6-acyl side chain of the penicillin or in the 7-acyl side chain of the cephalosporin, so that it will be lost in the cleavage reaction, it does not matter whether or not the blocking group is one which can be easily removed. The amino protecting group can be such as a C$_1$-C$_3$-alkanoyl, C$_6$-C$_{12}$-aroyl, C$_1$-C$_3$-alkyloxycarbonyl, or C$_6$-C$_{12}$-aryloxycarbonyl or one of such groups substituted by halo, nitro, or C$_1$-C$_3$-alkyloxy groups. Specific examples of amino protecting groups include formyl, acetyl, propionyl, chloroacetyl, dichloroacetyl, benzoyl, p-nitrobenzoyl, phthaloyl, p-methylbezoyl, 2,4-dinitrophenyl, tert-butyloxycarbonyl, and benzyloxy carbonyl, and the like. Mixtures of amine protecting groups in a particular batch of penicillin or cephalosporin to be cleaved can also be used. Such mixtures are obtained when a mixed anhydride such as chloroacetic propionic anhydride is used as the reagent to form the amino protecting group. Hydroxyl groups are commonly protected by the formation of esters, and particularly by the formation of formyl esters. Mercapto groups are protected by conversion to mixed sulfides such as the benzyl, benzhydryl, trityl or tert-butyl sulfides, by formation of mixed disulfides, by formation of thioesters, or as the thiocarbamyl, or S-acetamidomethyl group. Those skilled in the art will recognize that this list of blocking groups is merely illustrative and that there are many other amino, hydroxy and mercapto protecting groups that can be used.

In accordance with my improvement the carboxyl groups in the penicillin or cephalosporin molecule are protected by conversion to mixed anhydrides. The mixed anhydride to be employed is one derived from an acid having the following formula

(III)

wherein R''' is
$C_1$-$C_8$ alkyl, alkenyl, or alkynyl;
halo $C_1$-$C_8$ alkyl, alkenyl, or alkynyl;

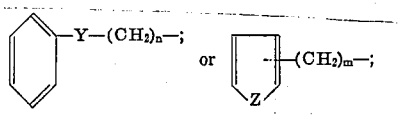

Y is oxygen, sulfur, or a carbon to carbon bond;
n is an integer of 0 to 3 and is at least 1 when Y is oxygen or sulfur;
Z is oxygen, sulfur, or

and
m is an integer of 1 to 3.

Specific examples of suitable mixed anhydrides include those derived from acetic acid, chloroacetic acid, propionic acid, valeric acid, crotonic acid, propiolic acid, 3-chloro-2-pentenoic acid, 4-bromo-2-butynoic acid, phenylacetic acid, phenoxyacetic acid, benzoic acid, furylacetic acid, and thienylacetic acid. I prefer the acetic and propionic mixed anhydrides because of their simplicity and ease of preparation. Those skilled in the art will recognize that there are other mixed anhydrides which will perform the same blocking function as those named and which are equivalent in my process.

Methods of preparing mixed anhydrides are well known to those skilled in the art and any method may be chosen. The particular manner in which the anhydride is formed is not important to my process. I have had particularly good results by treating a penicillin or a cephalosporin with an acid halide, particularly acid chlorides, in the presence of a hydrogen halide acceptor such as a tertiary amine. I have also prepared the acetic mixed anhydride by treatment of a penicillin or a cephalosporin with ketene. The preparation of the mixed anhydride will be illustrated in the examples.

This blocked penicillin or cephalosporin is now treated with a halogenating agent as described in the prior art to convert the 6-acylamido group of the penicillin or the 7-acylamido group of the cephalosporin to an imino halide. Suitable halogenating agents for use in this step are described in the prior art and include such compounds as phosphorous pentachloride, phosphorous oxychloride, phosphorous trichloride and thionyl chloride. Phosphorous pentachloride is preferred. The reaction is preferably carried out in the presence of a tertiary amine such as quinoline, pyridine, dimethylaniline, or diethylaniline.

In general, low temperatures are preferred for the halogenation reaction. Both time and temperature are dependent upon halogenating agent employed. Ordinarily, temperatures below about 30° C. are used. For example, phosphorous pentachloride reacts very rapidly so that a temperature below about 0° C. is preferred. Phosphorous oxychloride reacts more slowly so that a somewhat higher temperature may be used.

The imino chloride is then converted to an imino ether by reaction with an alcohol or phenol. This reaction too, is preferably conducted at temperatures below about 30° C. in the presence of a tertiary amine to bind the hydrogen halide that is released. Temperatures below about 0° C. are best. The preferred alcohols are the lower alkanols containing up to about six carbon atoms or benzyl alcohol. Methanol, ethanol, and n-propanol are especially preferred. Phenols may also be used, but are not as satisfactory as the lower alkanols. Sulfhydryl compounds have also been successfully used.

The imino bond of the imino ether is readily split by mild acidic or basic hydrolysis or alcoholysis. If the addition of acid binder is properly controlled in the preceeding steps, the reaction mixture will be sufficiently acidic at this point that hydrolysis will occur merely upon the addition of water. The hydrolysis can also be conducted under mildly alkaline conditions as in the presence of an alkali metal salt of a weak acid. The process of hydrolysis or alcoholysis of imino ethers is well known to those skilled in organic chemistry.

The advantage of my improvement of carboxyl protection through mixed anhydride formation is that double bond isomerization in cephalosporins is not a problem as with many esters and the carboxyl blocking group will be removed during the imino ether formation or hydrolysis step. Thus, the product from the hydrolysis of a penicillin is a free 6-aminopenicillanic acid (6-APA), and from the hydrolysis of cephalosporin is a free 7-amino cephalosporanic acid (7-ACA) or a derivative thereof with the variation being in the 3-position as defined above. No additional carboxyl deblocking step is necessary. With respect to penicillins, my process allows the isolation of 6-APA, per se, in contrast to the side chain cleavage of carbon esters of penicillins which yield a carbon ester of 6-APA which is normally reacylated before deblocking. Reacylation of penicillins before ester group removal is dictated or predicated on the fact that penicillin esters are more satisfactorily deblocked than are 6-APA esters. The β-lactam of 6-APA esters is especially sensitive to rupture in acid or base hydrolysis and to reductive conditions of deesterification.

The following examples will illustrate my improvement in the cleavage process.

EXAMPLE 1

To a suspension of 3.6 g. (4.9 mmole, 87.5 percent pure) of the monoquinoline salt of N-chloroacetyl-cephalosporin C monohydrate in 38 ml. of freshly distilled chloroform were added 2.08 g. (17.1 mmole) of N,N-dimethylaniline, 1.72 g. (22 mmole) of acetyl chloride and four drops of dimethylformamide. The mixture was stirred at room temperature for 45 minutes. The starting material was in solution within 20 minutes, and the solution was a deep yellow color. The mixture was cooled in a carbon tetrachloride-dry ice bath for approximately 10 minutes and an additional 2.08 g. (17.1 mmole) of N,N-dimethylaniline and 2.4 g. (11.6 mmole) of phosphorous pentachloride were added. The mixture was stirred in the cold for 2 hours, after which time about 12 ml. of n-propanol was added. The mixture was stirred in the cold another two hours. Water (20 ml.) was added and the mixture was allowed to warm to room temperature over a period of about 30 minutes. The chloroform and aqueous phases were separated and the chloroform was washed twice with 5 ml. portions of water. The aqueous phase and the washes were combined and washed first with chloroform, then with ethyl acetate. The pH of the aqueous phase was adjusted to 3.6 with concentrated ammonium hydroxide and the mixture was refrigerated overnight. The 7-ACA that had crystallized was collected by filtration and dried for 24 hours in vacuo. The yield of 7-ACA was 1.075 g. The filtrate contained additional 7-ACA as observed on thin layer chromatography.

EXAMPLE 2

Example 1 was repeated except the 2.2 g. of quinoline rather than dimethylaniline was added with the phosphorous pentachloride and 25 percent sodium hydroxide solution rather than ammonium hydroxide was used to adjust the pH of the aqueous phase at the completion of the reaction. The yield of 7-ACA was 1.14 g.

EXAMPLE 3

To a suspension of 3.3 g. (4.9 mmole, 94.7 percent pure) of the monoquinoline salt of N-Chloroacetylcephalosporin C monohydrate in 38 ml. of redistilled chloroform were added 2.55 g. (17.1 mmole) of N,N-diethylaniline, 1.72 g. (22 mmole) of acetyl chloride and four drops of dimethylformamide. The mixture was stirred at room temperature for 45 minutes and then cooled in an ice-salt bath at −5° to −10° C. To the cold mixture were added 2.55 g. (17.1 mmole) of diethylaniline and 2.4 g. (11.6 mmole) of phosphorous pentachloride. The mixture was stirred in the cold for 30 minutes, 12 ml. of cold methanol was added and stirring was continued an additional 30 minutes. Cold water (20 ml.) was added, the cooling bath was removed, and vigorous agitation was maintained for 10 minutes. The aqueous layer was separated, washed with chloroform and the pH was adjusted to 3.6 in the cold by the addition of saturated ammonium bicarbonate solution. The precipitated 7-ACA was filtered after 30 minutes, washed with cold acetone and then dried in a vacuum dessicator at 50° C. The yield of 7-ACA was 1.12 g.

EXAMPLE 4

The procedure of Example 1 was repeated using 2.04 g. of propionyl chloride in place of the acetyl chloride. The yield of 7-ACA was 1.07 g.

EXAMPLE 5

The procedure of Example 1 was repeated using 2.48 g. of chloroacetyl chloride in place of the acetyl chloride. The yield of 7-ACA was 700 mg.

EXAMPLE 6

Example 1 was repeated using methylene chloride as solvent instead of chloroform. The yield of 7-ACA was 1.01 g.

EXAMPLE 7

Example 6 was repeated substituting N,N-dimethylbenzylamine for the dimethylformamide. The yield of 7-ACA was 1.02 g.

EXAMPLE 8

Example 2 was repeated using 2.2 g. of freshly distilled quinoline instead of the N,N-dimethylaniline in the preparation of the acetic mixed anhydride. The yield of 7-ACA was 790 mg.

EXAMPLE 9

Example 1 was repeated except that the N,N-dimethylaniline was replaced by dry pyridine in each of the steps. The yield of 7-ACA was 300 mg.

EXAMPLE 10

Example 1 was repeated using 3.4 g. of phenylacetyl chloride in the place of the acetyl chloride. The yield of 7-ACA was 584 mg.

EXAMPLE 11

Example 1 was repeated substituting 3.0 g. of phenoxyacetyl chloride for the acetyl chloride. The yield of 7-ACA was 310 mg.

EXAMPLE 12

Example 1 was repeated using 2.8 g. of thiophene-2-acetyl chloride for the acetyl chloride. The yield of 7-ACA was 210 mg.

EXAMPLE 13

Example 1 was repeated starting with 2.4 g. of N-p-toluenesulfonylcephalosporin C instead of N-chloroacetylcephalosporin C monoquinoline salt monohydrate. The yield of 7-ACA was 200 mg.

EXAMPLE 14

To a suspension of 3.3 g. (4.9 mmole, 94.7 percent pure) of the monoquinoline salt of N-chloroacetylcephalosporin C monohydrate in 80 ml. of freshly distilled chloroform was added eight drops of dimethylacetamide. Ketene was passed through the stirred mixture at room temperature for 35 minutes at which time the starting material was completely dissolved. A stream of nitrogen was then passed through the reaction mixture to drive out the excess ketene. The mixture was cooled to −20° C. and 2.07 g. (17.1 mmole) of N,N-dimethylaniline and 2.4 g. (11.5 mmole) of phosphorous pentachloride were added. The mixture was stirred at −20° C for 2 hours, then treated with 12 ml. of n-propanol and stirred an additional 2 hours at −20° C. Water (20 ml.) was added, the cooling bath was removed and the mixture was stirred for 15 minutes. The aqueous layer was separated, washed with chloroform and the pH adjusted to 3.6 in the cold. The precipitated 7-ACA was recovered by filtration and dried in vacuo at 50° C. The yield of 7-ACA was 1.01 g.

EXAMPLE 15

Example 1 was repeated substituting heptanoyl chloride for the acetyl chloride. The presence of 7-ACA in the aqueous extract was detected by thin layer chromatography.

EXAMPLE 16

Example 1 was repeated substituting pivaloyl chloride for the acetyl chloride. The presence of 7-ACA in the aqueous extract was detected by thin layer chromatography and bioautography.

EXAMPLE 17

To a suspension of 2.4 g. (5 mmole) of the monoacetic acid solvate of cephalosporin C in 38 ml. of methylene chloride were added 3.26 g. (27 mmole) of N,N-dimethylaniline, 1.73 g. (22 mmole) of acetyl chloride and six drops of dimethylformamide. The mixture was stirred at room temperature until complete solution occurred (about 2 hours). The solution was then cooled to −20° C. and treated with 2.07 g. (17.1 mmole) of N,N-dimethylaniline and 2.4 g. (11.5 mmole) of phosphorous pentachloride. The mixture was stirred at −20° C. for two hours and 12 ml. of n-propanol was added. Stirring and cooling were continued for another 2 hours. Water (10 ml.) was added and the mixture was stirred for about 10 minutes. The aqueous layer was separated, washed with chloroform and the pH adjusted to 3.6 with concentrated ammonium hydroxide in the cold. The yield of 7-ACA was 600 mg.

EXAMPLE 18

A suspension of 2.4 g. (5 mmole) of the monoacetic acid solvate of cephalosporin C in 40 ml. of redistilled chloroform was treated with a stream of ketene for 1 hour at room temperature. The excess ketene was removed using a stream of dry nitrogen. The reaction mixture was then cooled to about −20° C. for the addition of 2.07 g. (17.1 mmole) of N,N-dimethylaniline and 2.4 g. (11.5 mmole) of phosphorous pentachloride. The mixture was stirred in the cold for 2 hours, 12 ml. of n-propanol was added, and stirring was continued for 2 hours more. Hydrolysis was effected by the addition of 20 ml. of water and allowing the mixture to warm to room temperature. The aqueous phase was separated, washed with chloroform, and the pH adjusted to 3.6. The crystalline product, 7-ACA, weighed 758 mg. after drying for 3 hours at 50° C. in vacuo.

Examples 17 and 18 demonstrate the simultaneous blocking of the carboxyl groups and the free amino groups. In both examples the carboxyl groups were converted to the mixed acetic anhydrides and the amino group was acetylated at the same time.

EXAMPLE 19

To a suspension of 1.74 g. (5 mmoles) of 7-phenoxyacetamidodesacetoxycephalosporanic acid in 40 ml. of dry benzene were added 10 mmoles of N,N-dimethylaniline, 10 mmoles of acetyl chloride and 10 drops of dimethylformamide. The mixture was stirred until complete solution occurred (approximately 75 minutes). The mixture was placed in a water bath at 45° C. and 7.5 mmoles each of N,N-dimethylaniline and phosphorous pentachloride were added. Stirring was continued at 45° C. for 1½ hours. The reaction mixture was cooled to room temperature for the addition of 20 ml. of n-propanol, and stirring was continued at room temperature for 1 hour. The solvent was removed in vacuo and 40 ml. of chloroform and 20 ml. of water were added. The hydrolysis was completed within 20 minutes. The aqueous phase was separated, washed with chloroform and the pH adjusted to 3.5 in the cold to crystallize 100 mg. of 7-aminodesacetoxycephalosporanic acid. The thin layer chromatogram and ultraviolet and nuclear magnetic resonance spectra of the sample corresponded with those from a known sample prepared by other methods.

EXAMPLE 20

A mixture of 21.5 g. of sodium penicillin G [sodium 2,2-dimethyl-6-phenylacetamidopenam-3-carboxylate], 156 ml. of methylene chloride, 22.6 ml. of diethylaniline, and 13.8 ml. of acetyl chloride, at 14° C., was stirred for 2.5 hours, while the temperature rose to 22° C. to form the anhydride. The salt never went into complete solution. The mixture was chilled to −60° C. Then 16.3 ml. of N,N-diethylaniline and a solution of 19.7 g. of phosphorus pentachloride in 300 ml. of methylene chloride were added. The mixture was stirred at about −65° C. for 1.5 hours. Then 150 ml. of methanol was added while the temperature rose from about −70° C. to about −20° C. The mixture was stirred an additional 1.5 hours. The reaction mixture was added to 300 ml. of distilled water, the mixture was stirred for 5 minutes, and the layers were allowed to separate. The aqueous layer was separated and scrubbed with 300 ml. of methylene chloride, the layers were separated, and the pH of the aqueous phase was adjusted (in an ice bath) from 0.9 to 3.4 with 22 ml. of concentrated ammonium hydroxide. The mixture was stirred for 30 minutes, filtered, and the filter cake containing the 6-aminopenicillanic acid (6-APA) was washed with 60 ml. of cold 50 percent aqueous methanol followed by 60 ml. of cold acetone. The washed solid product was dried at 40° C. in a vacuum oven overnight. The product weighed 7.3 g.

In another run using the same reactants and reagents but varying the stirring times (2 hrs. instead of 1.5 hours) and temperatures (−60° C. instead C. instead of −65° C.), the yield of 6-APA was 4.88 grams from the same quantities of starting material as indicated above.

EXAMPLE 21

A mixture of 23.2 g. of potassium penicillin V (potassium phenoxymethyl penicillin salt), 150 ml. of methylene chloride, 22.6 ml. of N,N-diethylaniline, and 13.8 ml. of acetyl chloride was stirred at 15° to 20° C. for 45 minutes to form the mixed anhydride of the penicillin. Then the reaction mixture was chilled to −65° C. The cooled reaction mixture was treated with 16.3 ml. of N,N-diethylaniline and a solution of 19.7 g. of phosphorus pentachloride in 300 ml. of methylene chloride was added while the temperature rose from −65° C. to −25° C. The mixture was stirred for 2 hours at less than −60° C. to insure complete reaction, and then treated with 150 ml. of methanol while the temperature rose from −67° C. to −30° C. The mixture was stirred again for 2 hours at less than −60° C. The above reaction mixture was then added to 300 ml. of distilled water and the temperature rose from −60° C. to −5° C. The mixture was stirred for 5 minutes, the layers were separated, and the pH of the aqueous layer was adjusted (in an ice bath) from 1.0 to 4.0 with 25 ml. of concentrated ammonium hydroxide. The mixture was allowed to set overnight in a refrigerator. The solid which precipitated was filtered, and the filter cake containing the 6-APA was washed with 20 ml. of cold aqueous 50 percent methanol followed by 20 ml. of cold acetone. The filter cake was then dried at 40° C. in a vacuum oven. The yield of 6-APA was 2.63 grams.

EXAMPLE 22

The procedure of Example 20 was essentially repeated except that after the mixed anhydride formation step with acetyl chloride, the mixture was cooled and maintained at about −38° to −42° C. instead of −60° to −70° C. during the $PCl_5/CH_3OH/H_2O$ cleavage steps. The yield of 6-aminopenicillanic acid was 6.03 g.

EXAMPLE 23

A mixture of 21.0 g. of penicillin V acid, 156 ml. of methylene chloride 32.4 ml. of N,N-diethylaniline, and was stirred and then 13.8 ml. of acetyl chloride was added at 0° C. over 3 minutes to form the ethyl mixed anhydride of the penicillin V acid, The mixture was cooled to −60° C. over 9 minutes. Then 16.3 ml. of N,N-diethylaniline was added while the temperature fluctuated from −60° C. to −57° C. Then a solution of 19.7 g. of phosphorus pentachloride in 300 ml. of methylene chloride was added, during which time the temperature fluctuated up to −10° C. While maintaining cold conditions the mixture was stirred for 2 hours. The mixture partly solidified. Then 150 ml. of methanol was added while the temperature fluctuated from −65° C. to −38° C. The mixture was stirred for 90 minutes at about −60° C. minimum. Then 300 ml. of water was added and the temperature was allowed to rise from −60° C. to −5° C. The mixture was stirred 7 minutes, separated into layers, the aqueous layer was scrubbed with 300 ml. of methylene chloride, the layers were separated, and the pH of the aqueous layer (in an ice bath) was adjusted from 0.8 to 4.0 with 23 ml. of concentrated ammonium hydroxide. The mixture was stirred for 30 minutes, and then filtered. The 6-aminopenicillanic acid filter cake was washed with 60 ml. of cold 50 percent aqueous methanol followed by 60 ml. of cold acetone. The 6-aminopenicillanic acid was dried to constant weight in a 40° C. vacuum oven. It weighed 2.25 grams.

EXAMPLE 24

A mixture of 21.5 g. of sodium penicillin G, 156 ml. of chloroform, 22.6 ml. of N,N-diethylaniline was stirred and treated at 23° C. with 13.8 ml. of acetyl chloride to form the ethyl mixed anhydride of the penicillin G acid. The mixture was stirred for 1 hour at room temperature and then chilled to −20° C. A 16.3 ml. portion of N-N-diethylaniline was added, followed by dropwise addition (40 minutes) of a solution of 19.7 g. of phosphorus pentacloride in 300 ml. of chloroform, while keeping the temperature below −10° C. The mixture was stirred for a total of 85 minutes. Then 150 ml. of cold methanol was added dropwise (20 minutes) while keeping the temperature below −10° C. The mixture was stirred for a total of 80 minutes. Then 300 ml. of water was added while the temperature fluctuated from −18° C. to −7° C. The mixture was stirred for 5 minutes, the layers were separated, and the aqueous layer was scrubbed with 300 ml. of chloroform. The layers were separated. The pH of the aqueous layer was adjusted from pH 0.7 to 4.0 with 20 ml. of concentrated ammonium hydroxide. The mixture was set in a refrigerator overnight and then filtered. The solid was washed with 30 ml. of cold 50 percent aqueous methanol followed by 30 ml. of cold acetone, and then dried in a 40° C. vacuum oven to constant weight. The resulting 6-aminopenicillanic acid weighed 3.17 g.

EXAMPLE 25

To a solution of 21.0 g. of boric acid in 2000 ml. of a solution of sodium cephalosporin C mixed with sodium acetate, containing 40.4 mg./ml. of cephalosporin C, (termed a "resin eluate" solution buffered with sodium borate) there was added over 10 minutes a solution of 50.6 g. of propionic anhydride in 150 ml. of ethyl acetate to block the amino nitrogen. The temperature was maintained at 15° to 20° C. with a water bath and the pH maintained at 8.5 to 9.0 with 25 percent sodium hydroxide solution. When the pH remained constant (approximately 3 minutes after completion of the anhydride addition), the pH was lowered to 2.5 with 30 percent w/w sulfuric acid and then 75 g. of a filter aid (Celite 545) was added. The mixture was filtered and to the filtrate was added 91.5 ml. of quinoline. The pH was readjusted to 3.5 with sulfuric acid and the solution stirred 30 minutes at room temperature. The mixture was refrigerated overnight (5° C.). The N-propionyl-blocked cephalosporin C quinoline salt precipitate which formed was filtered, washed with water, and dried under vacuum at 40° C. It weighed 81.2 g. (97.6 percent yield) and contained 21.2 percent quinoline.

A 13.7 g. portion of the N-propionyl cephalosporin C quinoline salt, (estimated 90 percent purity), 20 millimoles, was mixed with 52 ml. of chloroform, 15.1 ml. of N,N-diethylaniline at 24° to 25° C. Acetyl chloride, 9.2 ml. was added at 25° C. The temperature rose to 41° C. over 2 minutes. The mixture was chilled in 12 minutes and then 10.9 ml. of N,N-diethylaniline was added at −16° to −12° C. Then a solution of 9.8 g. of phosphorus pentachloride in 100 ml. of chloroform was added at −12° C. The temperature rose to 17° C. forming the imino chloride. The mixture was chilled to about −15° C. and stirred 36 minutes. Then 50 ml. of cold (10° C.) methanol was added to form the methyl ether. The mixture was chilled to about −15° C. and stirred 38 minutes to insure comlete reaction. Then 100 ml. of distilled water was added, the mixture was stirred 5 minutes, separated and the pH of the aqueous phase as adjusted (in an ice bath) from 1.0 to 3.5 with 10 ml. of concentrated ammonium hydroxide. The mixture was stirred for 30 minutes and filtered. The solid material was washed with 20 ml. of 50 percent aqueous methanol and then with 20 ml. of acetone and then dried in a 40° C. vacuum oven overnight. The solid, 7-aminocephalosporanic acid, weighed 4.54 g. having a purity of 98.2 percent by the ultraviolet spectral method, or 94.3 percent purity by the nicotinamide assay method.

EXAMPLE 26

An 11.84 g. portion (containing 20 millimoles) of a zinc complex or salt of cephalosporin C, assuming 80.7 percent purity in 53 ml. of chloroform was treated with 17.8 ml. of N,N-diethylaniline and then with 10.9 ml. of acetyl chloride at 24° to 44° C. in 15 minutes to form the anhydride. The mixture was chilled to −19° C. and treated with 10.9 ml. of diethylaniline. To this mixture a solution of 9.8 g. of phosphorus pentachloride in 100 ml. of chloroform was added at −19° C. The temperature rose to 14° C. forming the imino chloride. The mixture was chilled to −15° C. and stirred 45 minutes to insure complete reaction. Then 50 ml. of cold methanol (−19° C. to 9° C.) was added to form the methyl ether. The mixture was chilled to −10° C. and stirred 45 minutes to insure complete reaction. Then 100 ml. of distilled water was added to effect cleavage. The mixture was stirred 5 minutes in an ice bath and then the phases were separated. The aqueous phase was scrubbed with 100 ml. of chloroform and then separated. The pH of the aqueous phase, cooled in an ice bath, was adjusted from 0.2 to 3.7 with 11 ml. of concentrated ammonium hydroxide. The mixture was stirred for 30 minutes and filtered. The filter cake was washed with 20 ml. of cold 50 percent aqueous methanol followed by 20 ml. of cold acetone. The cake was then dried in a vacuum oven at 40° C. overnight. The 7-aminocephalosporanic acid weighed 3.36 g. having a purity of 93.8 percent by the ultraviolet method (58 percent yield by U/v method); and an 86.3 percent purity by the nicotinamide method.

The mixed anhydride blocked cephalosporins, obtained as intermediates in my process are new compounds not reported heretofore. For example the mixed anhydride blocked cephalosporin C is one having the formula (IV)

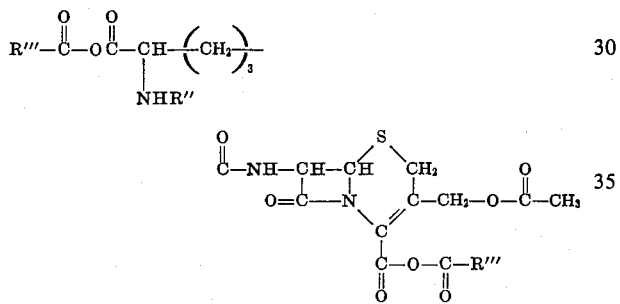

where R''' is as defined above in formula (III), and R'' is an amino protecting group already present before formation of the mixed anhydride or is acetyl when ketene is used to block the carboxyl groups in cephalosporin C wherein the amino group is not protected (R'' is hydrogen).

Since the preferred mixed anhydrides are the acetic and propionic mixed anhydrides the preferred values of R''' are methyl and ethyl. The particular amino protecting group used is not important and is not the novel feature of my compounds. Amino protecting groups are well known to those skilled in the art and are described hereinabove. A preferred amino protecting group is the chloroacetyl group.

The mixed anhydride of penicillin G (V) obtained as an intermediate in my process was reported in J.A.C.S., 70, 3966 (1948).

(V)

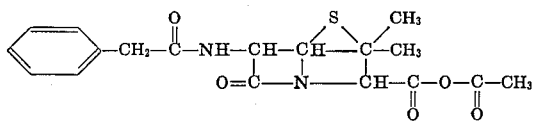

I claim:
1. In a method for the cleavage of a 6-carboxamido group of a penicillin having the formula

(I)

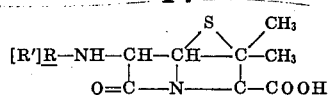

or of a 7-carboxamido group of a cephalosporin having the formula (II)

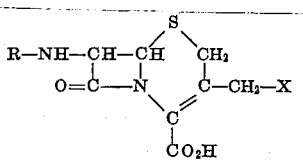

wherein
R is aminoadipoyl [$HO_2C\text{-}CH(NH_2)\text{-}(CH_2)_3\text{-}C(O)$ -], an aminoadipoyl in which the amino nitrogen is protected with
$C_1$-$C_3$-alkanoyl
$C_6$-$C_{12}$-aroyl
$C_1$-$C_3$-alkyloxycarbonyl
$C_6$-$C_{12}$-aryloxycarbonyl, or such a group substituted with halo, nitro, or $C_1$-$C_3$-alkoxy groups;
$C_2$-$C_8$-alkanoyl,

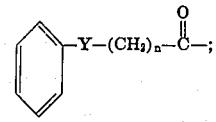

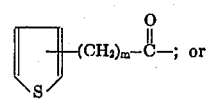

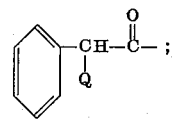

X is
$C_2$-$C_6$-alkanoyloxy
$C_2$-$C_6$-thioalkanoyloxy
$C_6$-$C_{12}$-thioaroyloxy
hydroxy,
mercapto,
hydrogen,
$C_1$-$C_3$-alkoxy thionocarboxylthio
$C_1$-$C_6$-alkoxy, or
$C_1$-$C_6$-alkylthio;
Y is oxygen, sulfur, or a carbon to carbon bond;
n is an integer of 0 to 3 and is at least 1 when Y is oxygen or sulfur;
m is an integer of 1 to 3; and
Q is amino or hydroxy;
by the steps of blocking any carboxyl, amino, hydroxy and mercapto groups in the molecule, treating the blocked penicillin or cephalosporin with phosphorous pentachloride to convert 6-carboxamido group of the penicillin or the 7-carboxamido group of the cephalosporin to an imino halide, treating the imino halide with a lower alkanol containing up to about six carbon atoms or benzyl alcohol to form an imino ether, and hydrolyzing the imino ether to form a 6-amino or a 7-amino group, the improvement which comprises blocking the carboxyl groups by converting them to a mixed anhydride derived from an acid having the formula $$R'''\text{-}CO_2H$$

wherein
R''' is $C_1$-$C_8$-alkyl, alkenyl, or alkynyl;
halo $C_1$-$C_8$-alkyl, alkenyl, or alkynyl;

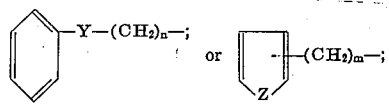

Y is oxygen, sulfur or a carbon to carbon bond;
n is an integer of 0 to 3 and is at least 1 when Y is oxygen or sulfur;
Z is oxygen, sulfur, or

and
m is an integer of 1 to 3.

2. A method as in claim 1 wherein the lower alkanol is methanol.

3. A method as in claim 1 wherein the lower alkanol is n-propanol.

4. A method as in claim 1 wherein R''' is a $C_1$-$C_8$-alkyl.

5. A method as in claim 4 wherein the lower alkanol is methanol.

6. A method as in claim 4 wherein the lower alkanol is n-propanol.

7. A method as in claim 4 wherein R''' is ethyl.

8. A method as in claim 7 wherein the lower alkanol is methanol.

9. A method as in claim 7 wherein the lower alkanol is n-propanol.

10. A method as in claim 1 wherein a cephalosporin is used and the cephalosporin is cephalosporin C or a derivative thereof.

11. A method as in claim 10 wherein R''' is $C_1$-$C_8$-alkyl, and the lower alkanol is methanol.

12. A method as in claim 10 wherein R''' is $C_1$-$C_8$-alkyl, and the lower alkanol is n-propanol.

13. A method as in claim 12 wherein R''' is ethyl.

14. A method as in claim 11 wherein R''' is ethyl.

15. A method as in claim 1 wherein a penicillin is used and the penicillin is penicillin V.

16. A method as in claim 1 wherein a penicillin is used and the penicillin is penicillin G.

17. A blocked cephalosporin C having the formula

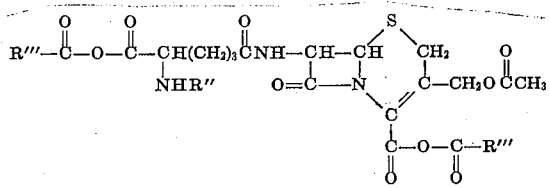

wherein
R''' is $C_1$-$C_8$ alkyl, alkenyl, or alkynyl;
halo $C_1$-$C_8$ alkyl, alkenyl, alkynyl;

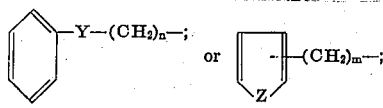

Y is oxygen, sulfur, or a carbon to carbon bond;
n is an integer of 0 to 3 and is at least 1 when Y is oxygen or sulfur;
Z is oxygen, sulfur, or

m is an integer of 1 to 3; and
R'' is an amino protecting group.

18. A blocked cephalosporin C as in claim 17 wherein R''' is $C_1$-$C_8$-alkyl.

19. A blocked cephalosporin C as in claim 18 wherein R''' is methyl.

20. A blocked cephalosporin C as in claim 17 wherein R'' is chloroacetyl.

21. A blocked cephalosporin C as in claim 20 wherein R' is methyl.

22. A blocked cephalosporin C as in claim 17 wherein R'' is propionyl.

23. A blocked cephalosporin C as in claim 17 wherein R''' is ethyl.

* * * * *